United States Patent [19]
Cox

[11] Patent Number: 5,844,891
[45] Date of Patent: Dec. 1, 1998

[54] CELL-BASED CLOCK RECOVERY DEVICE

[75] Inventor: Neil Cox, British Columbia, Canada

[73] Assignee: Newbridge Networks Corporation, Kanata, Canada

[21] Appl. No.: 750,196

[22] PCT Filed: May 30, 1995

[86] PCT No.: PCT/CA95/00320

§ 371 Date: Feb. 19, 1997

§ 102(e) Date: Feb. 19, 1997

[87] PCT Pub. No.: WO95/33320

PCT Pub. Date: Dec. 7, 1995

[30] Foreign Application Priority Data

Jun. 1, 1994 [GB] United Kingdom .................... 9410943

[51] Int. Cl.[6] ........................................................ H04J 3/14
[52] U.S. Cl. .......................... 370/235; 370/395; 370/412; 370/503
[58] Field of Search .................................... 370/395, 396, 370/503, 504, 505, 506, 507, 508, 509, 510, 511, 512, 513, 514, 515, 516, 517, 518, 519, 520, 522, 357, 358, 375, 384, 229, 230, 231, 232, 233, 234, 235, 236, 237, 241, 252, 253, 412, 415, 417, 428, 429; 375/354, 355, 356, 357, 358, 359, 360, 362, 363, 364, 365, 369, 370, 371, 372, 373; 340/825.06, 825.14; 395/200.63, 200.62; 364/239.1, 239.6, 939.4

[56] References Cited

U.S. PATENT DOCUMENTS

5,027,351  6/1991  De Prycker et al. .................... 370/229
5,486,784  1/1996  Eriksson ................................. 375/372

FOREIGN PATENT DOCUMENTS

WO 88 07297  9/1988  WIPO .

OTHER PUBLICATIONS

Singh et al., "Jitter and Clock recovery for periodic traffic in broadband packet networks," IEEE Transactions on Communications, pp. 2189–2196, May 1994.

"Rate based end–to–end clock synchronization," IBM Technical Disclosure Bulletin, vol. 37, No. 04B, Apr. 1994.

Primary Examiner—Huy D. Vu
Attorney, Agent, or Firm—Marks & Clerk

[57] ABSTRACT

A clock recovery unit provides a clock recovery function in the receiving entity of a system to implement adaptation of constant bit-rate (CBR) services over an asynchronous transfer mode (ATM) or ATM-like network. Incoming cells are periodically sampled for buffer fill level $L_j$. The maximum fill level of undelayed cells $Lx_j$ is extracted from successive series of a predetermined whole number M of buffer-fill samples $L_j$. A frequency adjustment logic unit provides at its output a bit stream at a given clock frequency $f_j$. The frequency adjustment logic unit makes incremental adjustments to the clock frequency $f_j$ tending to cause the steady state mean of the fill level $Lx_j$, or its derivative, to move toward zero.

21 Claims, 3 Drawing Sheets

CELL-BASED CLOCK RECOVERY DEVICE

FIELD OF THE INVENTION

This invention relates to digital transmission systems, and more particularly to a cell-based clock recovery (CBCR) device for providing a clock recovery function in the receiving entity of a system to implement adaptation of constant bit-rate (CBR) services over an asynchronous transfer mode (ATM) or ATM-like network.

DESCRIPTION OF PRIOR ART

Asynchronous Transfer Mode (ATM)) is a high-speed digital communications protocol for which the basic functional unit is a fixed-length 424-bit (53-byte) cell. Five bytes of each cell are allocated for routing and control, and the remaining 48 bytes are used for data transport. On entry to an ATM-based network, information is loaded into cells in accordance with standardized formatting protocols called adaptation protocols. Once the cell has being filled, it is transported through the network as soon as possible. Buffers are used throughout ATM-based networks to deal with congestion, i.e., cases where more than one cell is ready for transport over a given communications link.

As suggested by the name, constant bit rate (CBR) services transmit data bits at a nominally constant rate. More specifically, transmitting entities for CBR services use a reference clock to time the delivery of data bits. Receiving entities must access the same clock, either directly or indirectly, to retrieve the data.

Reference clocks used in CBR services must operate within standardized specifications for mean operating frequency, maximum jitter and maximum wander. Jitter and wander are constraints on high-frequency variability and low-frequency variability about the mean operating frequency, respectively. Jitter and wander are generally measured in terms of the offset of clock pulses from where they would be if the clock were consistently operating at precisely its mean operating frequency. Jitter is short-term deviation in the pulse center-points from where they would be if the clock was fixed at its mean frequency. Wander is the equivalent long term variation. Jitter is measured in the order of Hertz, whereas wander is measured in the order of hours or days.

The following specifications, drawn from the ANSI specification for T1 service, provide an example of requirements for CBR clocks. Here a UI is a unit interval or clock period, which for T1 is 648 ns:

The mean operating frequency must be 1.544±50 Hz.

Jitter in the frequency band between 10 HZ and 40 KHz must be less than 0.5 UI peak-to-peak, and jitter in the frequency band between 8 Khz and 40 Khz must be less than 0.07 UI peak-to-peak.

Wander must be less than 5 UI peak-to-peak over any 15-minute period, and must be less than 28 UI peak-to-peak over any 24-hour period.

Clock recovery is a process by which entities within a communications network gain access to a reference clock when needed. There are two basic approaches to clock recovery. The first approach entails applying relatively simple techniques to a clock signal that is separately transmitted to the receiving entity. The other approach is to extract the clock from an analysis of the periodicity of the received data signal. While the second approach is generally more complex to implement and more prone to error, it obviates the need for transmission of a separate clock signal. Cell-based clock recovery is an example of the second approach.

When CBR services are transported over an ATM network, a recommended basis for controlling the output clock in the receiver is to monitor the buffer fill level [CCITT, B-ISDN—ATM Adaptation Layer for Constant Bit Rate Services: Functionality and Specification, Draft T1S1/92-570, Nov. 13, 1992]. If the receiver's output clock is slower than the sender's input clock, then the buffer fill-level will tend to increase with time. Conversely, if the receiver's output clock is faster than the sender's input clock, then the buffer fill-level will tend to decrease with time. The output clock can thus be adjusted based on trends in the buffer fill-level. In this arrangement, it is not necessary for both the sender and the receiver to have access to a common network clock. The approach can thus be used in more situations than the alternative recommended clock recovery method, i.e., the synchronous residual time stamp (SRTS) method. Such a method is described, for example, in PCT application no. PCT/EP88/00178 (WO 88/07297).

Large coincident variations in the buffer fill-level can be expected. Firstly, the buffer fill-level plotted as a function of time looks like a saw-tooth because data are inserted into the buffer in cell-sized (53-byte) blocks but are drained from the buffer one bit at a time. Secondly, variation in the observed buffer fill level can be introduced by the sequencing and relative prioritization of tasks performed within the service adaptation system. For example, such processing jitter in the transmitting entity can cause variation in the time spacing between transmitted cells which will manifest itself as buffer fill-level variation in the receiving entity. Finally, time-varying queuing delays will occur at points of congestion within the network. As with processing jitter, such time-varying queuing delays manifest themselves as buffer fill-level variation.

Of the three sources of coincident fill-level variation mentioned above, the most problematic is queuing delays within the network. Processing jitter is under the control of the system designer and can be reduced to a manageable level by proper design. The saw-tooth effects can be minimized by roughly synchronizing the sampling of the buffer fill-level with the arrival of ATM cells.

The Newbridge Mainstreet™ 36150 switch provides insight into the magnitude of fill-level variation due to queuing delays. The ATM cells pass through three switching stages, each of which has a 16-cell queue. The worst case scenario introduces a queuing delay of 48 cells. Given that 2.74 $\mu$s (i.e. 53 bytes at 155 Mbits/sec) are needed to transmit an ATM cell, the queuing delay through a single switch can be up to 132 $\mu$s. Allowing for processing jitter and the possibility of encountering a number of ATM switches, queuing delays can be expected to vary between zero and, say, 1000 $\mu$s. For T1 service adaptation this translates to a buffer-fill-level variation in the order of +/−800 bits.

Other queues in the network can be much longer than those of the Mainstreet™ 36150 switch. For example, the Newbridge T3 line interface card has a queue for up to about 3 ms of data. A delay variation of up to 3 ms may be encountered if ATM cells for T1 service are passed through the T3 card.

An approximate analysis for satisfying the T1 jitter requirements is as follows: if the clock estimate is updated at a rate of about 20 Hz, the maximum allowable frequency mismatch is about 10 Hz to satisfy the 0.5 UI jitter upper limit. This corresponds to a clock period that is accurate to within about 4 ps. Larger errors in the clock period can in principle be tolerated if the frequency of the clock update is increased. However, this does not simplify the task because less new data is available from which to obtain each frequency estimate.

The magnitude of the task to be performed is quite striking. The requirement is to derive an unbiased estimate of the T1 transmitter's clock period to an accuracy of a few picoseconds by analyzing, in effect, the periodicity of ATM cell arrival. However, cell arrival jitter of the order of +/−500 µs or more can be expected. It follows that the jitter variance must be reduced by a factor of in the order of $10^{12}$.

Clock wander is important to control in CBR services and is a significant problem within conventional cell-based cock recovery systems. Wander is important because buffers within some CBR networks are sized based on the wander requirements, and may in certain circumstances overflow if these requirements are not met. The problem with wander for conventional CBCR arises because the clock is, in effect, set based on low-pass filtered samples of the buffer fill level. Unfortunately, no matter how low one sets the roll-off frequency of the low-pass filter, there is always in principle a lower-frequency component that can get through the filter. Such components appear as clock wander. Because the size of such lower-frequency components depends on a variety of uncontrolled factors, it is difficult to specify limits of wander in CBCR systems and to verify conformance with standards for wander.

An object of the present invention is to address the aforementioned problems of the prior art.

SUMMARY OF THE INVENTION

According to the present invention there is provided a clock recovery unit for providing a clock recovery function in the receiving entity of a system to implement adaptation of constant bit-rate (CBR) services over an asynchronous transfer mode (ATM) or ATM-like network, comprising a buffer for receiving incoming cells, means for periodically sampling the buffer fill level $L_i$, means for obtaining an estimate $Lx_j$ of the buffer fill level on arrival of substantially undelayed cells from a series of buffer fill-level samples $L_i$, and a frequency adjustment logic unit providing at its output a control signal at a given clock frequency $f_j$, said frequency adjustment logic unit making incremental adjustments to said clock frequency $f_j$ to cause the steady state mean of said estimate $Lx_j$ of the buffer fill level on arrival of undelayed cells, or a derivative thereof, to move toward a predefined optimal operating point $L_{opt}$.

In one embodiment, the estimate $Lx_j$ is derived from blocks of fill-level samples, each block containing a predetermined number M of samples. However, the number of samples can change from block to block.

The control signal produced by the invention may be in the form of a bit stream, sine wave or other representation of the frequency of the derived clock.

The sampling of the buffer fill-level should normally be carried out in approximate synchronization with the arrival of cells to minimize the effects of the saw-tooth shape of the fill level of the buffer for the reasons specified.

One estimator of the buffer fill level on arrival of undelayed cells is the maximum of a block of fill-level samples. As indicated earlier the actual buffer fill level is in the form of a saw-tooth waveform because the cells arrive as a single block of 424 bits are then output one bit at a time at a constant rate. If the arriving cells are delayed, the fill level will tend to fall because more bits will be output before new cells arrive. The maximum fill level will occur when the cells arrive on time. The estimated maximum fill level is thus representative of the fill level for undelayed cells.

While the interfering traffic in the network may frequently create points of substantial congestion, it should also be relatively common for cells to pass through the network without substantial delay. Thus, the minimum of the cell delivery delays for a series of ATM cells should be relatively unaffected by the interfering traffic. It follows that the maximum buffer fill-level will also be relatively unaffected. Even if this is not completely true, it is reasonable to say that phenomena which increase the mean cell transmission delay will also increase the variance of the cell transmission delay, so the minimum delay will undergo a smaller change than the mean delay or the maximum delay.

The buffer fill level on arrival of undelayed cells can also be estimated from the weighted sum of two or more statistics drawn from a block of fill-level samples. For example, the mean fill level and/or the minimum fill level could be used in combination with the maximum fill level to obtain a composite estimate which, under certain conditions, leads to less wander than when the maximum fill-level is used in isolation.

When compared with the traditional approach of using the mean buffer fill level, the advantage of using the maximum buffer fill level or other estimate of the buffer fill level on arrival of undelayed cells, is particularly pronounced when a single bursty source of interfering ATM traffic periodically swamps the capacity of some point of congestion within the network. In this case the mean buffer fill level observed by the receiving entity will be severely affected by the interfering traffic, but the maximum buffer fill level or other estimate of the buffer fill level on arrival of undelayed cells will be relatively unaffected.

The invention also provides a method of providing a clock recovery function in the receiving entity of a system to implement adaptation of constant bit-rate (CBR) services over an asynchronous transfer mode (ATM) or ATM-like network, characterized in that it comprises the steps of receiving incoming cells in a buffer; periodically sampling the buffer fill level $L_i$; estimating $Lx_j$ of the buffer fill level on arrival of substantially undelayed cells from a series of buffer fill-level samples $L_i$; outputting a control signal at a given clock frequency $f_j$; and making incremental adjustments to said clock frequency $f_j$ to cause the steady state mean of the estimate $Lx_j$ of the buffer fill level on arrival of undelayed cells, or a derivative thereof, to move toward a predetermined optimal operating value.

The invention has been described with reference to an ATM network, but it is applicable to any similar type of packet-switched network having cells of data that are propagated through the network. The cells need not necessarily be of fixed length, and the invention is equally applicable to a packet-switched network employing blocks of data of variable size.

BRIEF DESCRIPTION OF THE DRAWING

The invention will now be described in more detail, by way of example only, with reference to the accompanying drawings, in which.

DESCRIPTION OF THE PREFERRED EMBODIMENTS

Figure 1:
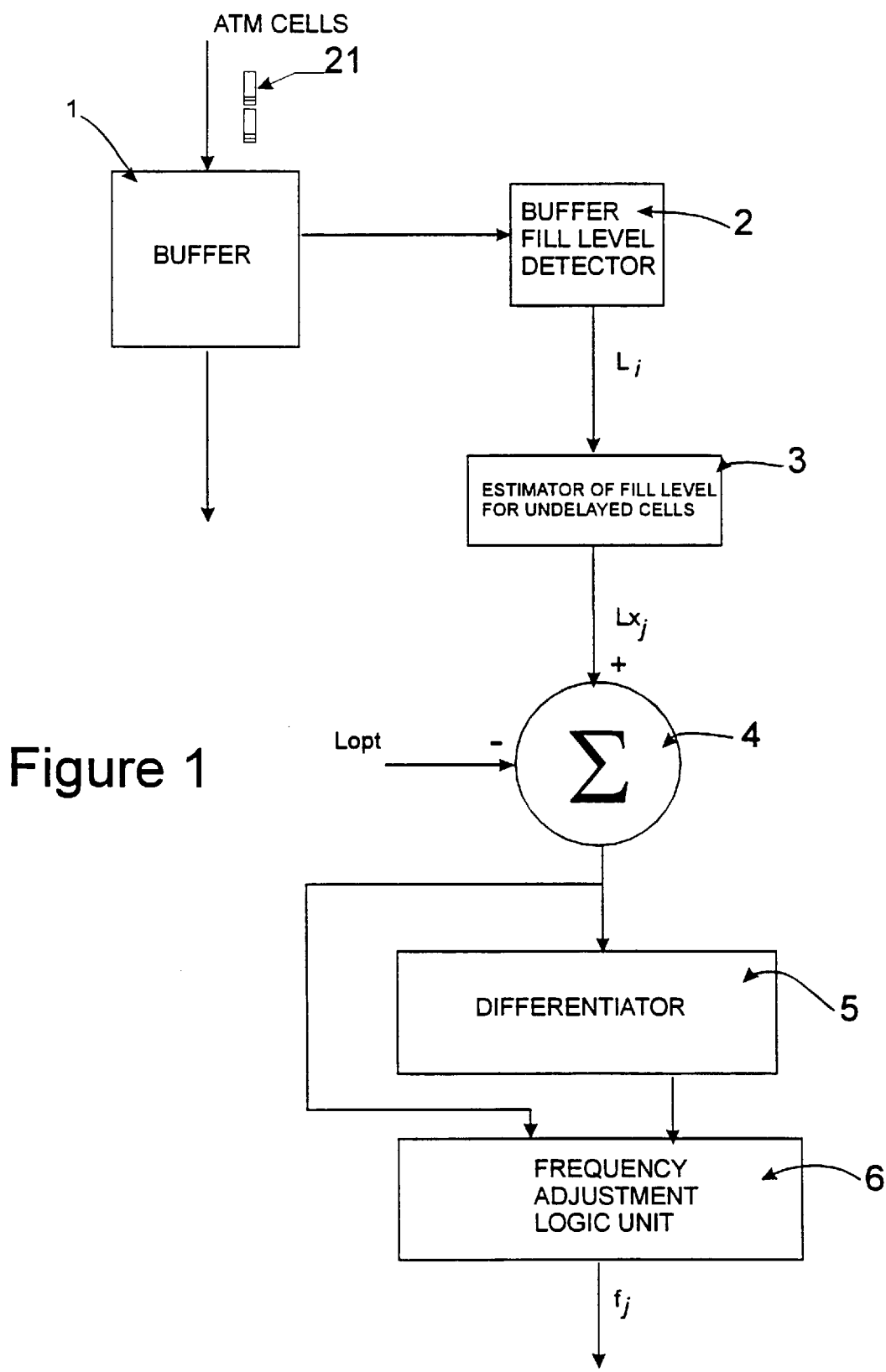
FIG. 1 is a general block diagram of a cell-based clock recovery unit in accordance with the invention.
Figure 4:
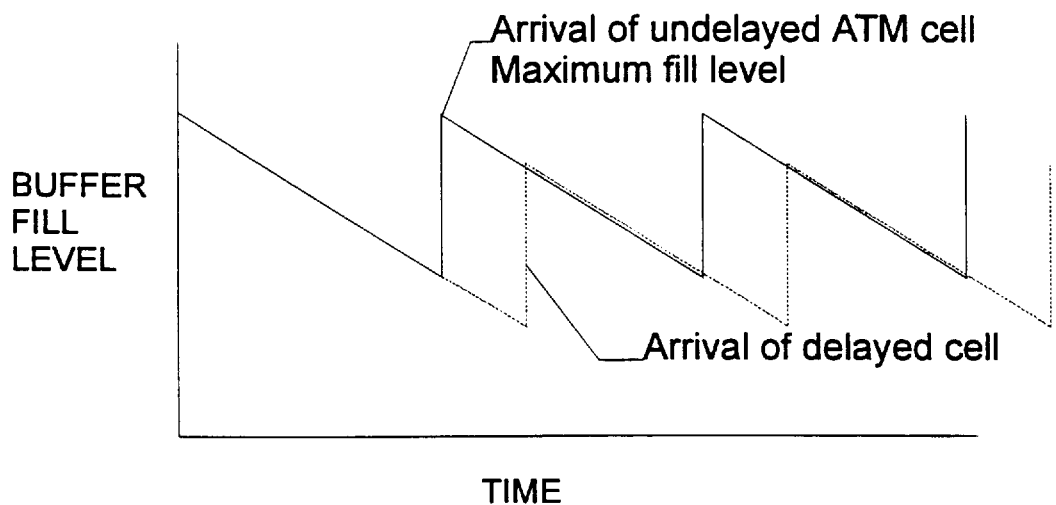
FIG. 4 shows the variation in buffer bill level with time.

Referring now to FIG. 1, incoming 53-byte ATM cells 21 are input to buffer 1 as they arrive from the network. The buffer outputs bits at a constant bit rate. As a result the fill level of the buffer 1 as a function of time can be represented by a saw-tooth waveform as shown in FIG. 4, which shows the fill level for undelayed cells in solid outline. The rising edge occurs when a cell arrives. If the cells are delayed the maximum fill level falls as shown in broken outline because more bits are output before the arrival of the next cell.

Referring again to FIG. 1, the fill-level $L_i$ of the buffer 1 is monitored by buffer fill-level detector 2. The samples of the buffer fill-level $L_i$ are obtained by periodic sampling of the buffer fill-level in approximate synchronization with the arrival of ATM cells to minimize the effects of the sawtooth shape of the fill level waveform.

The samples $L_i$ are passed to block 3, which is an estimator of buffer fill level for undelayed cells. This extracts its estimates from a sequential number M of buffer fill-level samples $L_i$, producing $Lx_j$, which is only updated after M new samples of $L_i$ have been scanned. That is subscript j increments M times slower than subscript i. M is a predetermined configuration parameter for the invention.

The fill level estimator can be a local maximum estimator, for example, or alternatively a unit taking the weighted summation of the mean fill level, the maximum fill level, or other statistics from a block of fill-level samples.

The output of block 3 is then fed to subtractor 4, which subtracts a pre-determined steady state optimum buffer fill level $L_{opt}$ from $Lx_j$, and the result is passed to the frequency adjustment logic block 6 along with an estimate of the derivative of $Lx_j$ produced by differentiator 5.

The choice of $L_{opt}$ is a choice between starvation avoidance and delay minimization. Larger values of $L_{opt}$ are needed to avoid starvation (buffer underflow) when cells are severely delayed during transmission. Small values of $L_{opt}$ are preferred to keep the mean delay within the network low. The parameter $L_{opt}$ provides a direct means of obtaining a balance between these two factors.

The frequency adjustment logic block 6 generates a signal representing a clock frequency $f_j$. Frequency adjustment logic block 6 then makes small incremental adjustments to the clock frequency $f_j$ such that the steady-state mean of one or both of its inputs tends toward zero.

Figure 2:
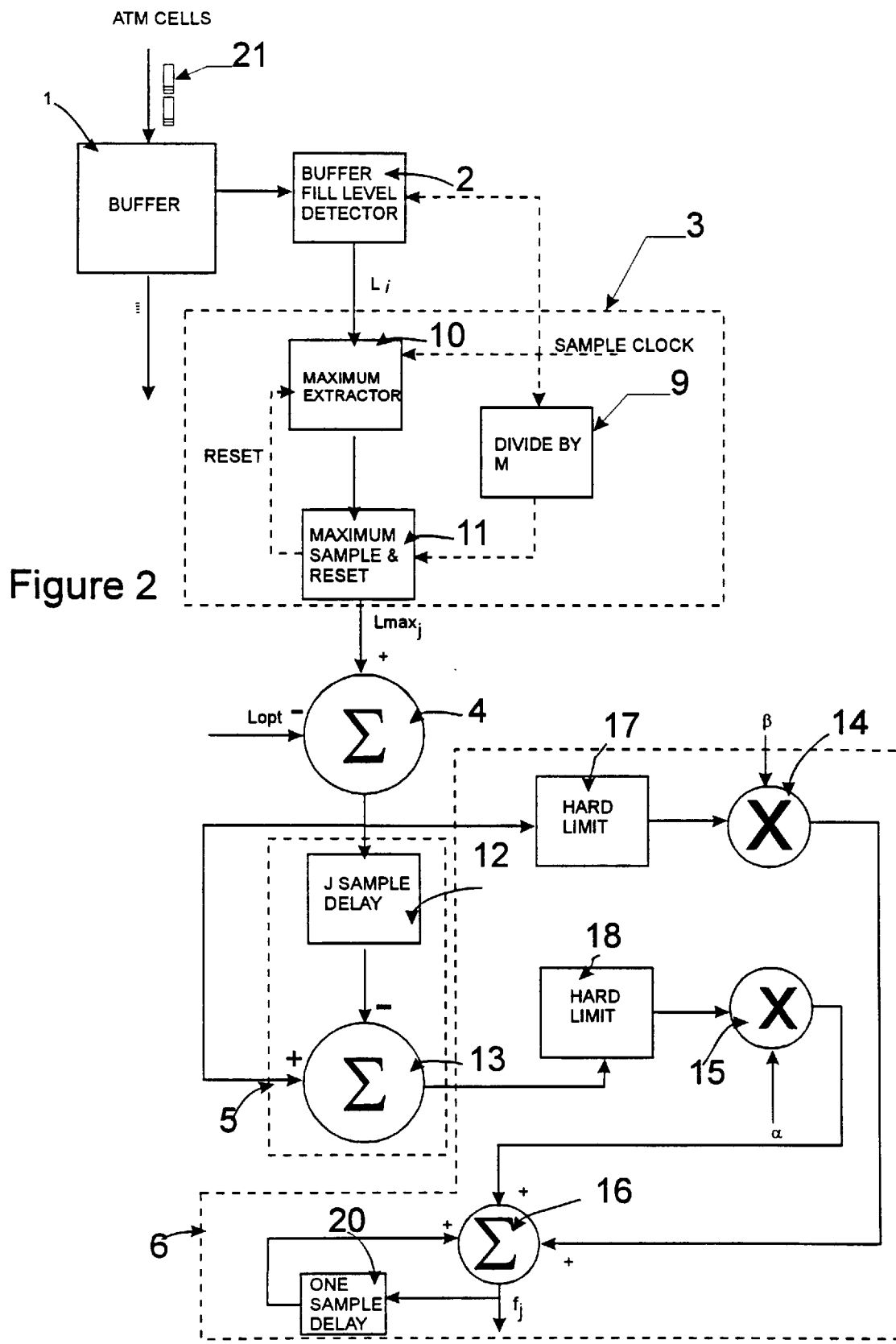
FIG. 2 is a general block diagram of one embodiment of a clock recovery unit in accordance with the invention.

FIG. 2 provides a detailed illustration of a preferred embodiment of the invention. $L_i$ represents sample i of the buffer fill level, $Lmax_j$ sample j of the recovered clock frequency, $L_{opt}$ the optimum steady-state maximum buffer fill level, is the index for the samples of buffer fill level, and j is the index for samples of the clock frequency and the maximum buffer fill level.

The Divide-by-M block 9, Maximum Extractor Block 10 and the Maximum Sample-and-Reset block 11 correspond to the block 3 of FIG. 1 since they provide an estimate of the fill level of undelayed samples. The block 10 outputs a signal representing the maximum of the fill level samples $L_i$ received from the fill level detector 2. Block 11 outputs the maximum $Lmax_j$ for each M samples and at the same time resets the maximum extractor 10. The result is an output signal $Lmax_j$ that represents the buffer fill level for undelayed samples.

An optimization signal $L_{opt}$, which is an optimization parameter for the system that depends on the operating conditions, is subtracted from $Lmax_j$ in summer 4. The output of summer 4 is input to the J sample delay block 12 and summer 13, which together correspond to the differentiator block 5 of FIG. 1.

Multipliers 14, 15 and summer 16 correspond to the Frequency Adjustment Logic block 6 of FIG. 1.

The embodiment shown in FIG. 2 implements the recursion relationship:

$$f_j = f_{j-1} + \alpha \times HDLIM_\alpha(Lmax_j - Lmax_{j-J}) + \beta \times (HDLIM_\beta(Lmax_j - Lopt)$$

where
  $f_j$=output clock frequency (Hz)
  $Lmax_j$=the maximum of M successive samples of the buffer fill level (bits)
  M=the length of the block from which each $Lmax_j$ is extracted (samples)
  Lopt=the optimal buffer fill level (bits)
  $\alpha$=first-order adaptation factor (Hz/bit)
  $\beta$=second-order adaptation factor (Hz/bit)
  J=the block separation
  $HDLim_\alpha$=hard limit with threshold $THR_\alpha$
  $HDLim_\beta$=hard limit with threshold $THR_\beta$ In the absence of coincident sources of variation, the buffer fill-level changes in direct proportion to the difference between the transmitting entity's clock and the receiving entity's clock. Thus, $\alpha$ serves to adapt $f_j$ toward the input clock frequency. The other factor $\beta$ performs the secondary function of moving the buffer fill-level toward the preselected "optimal" value $L_{opt}$. Without $\beta$, the unit will come to rest at an arbitrary fill level which may be too low to avoid starvation (buffer underflow) or too high to avoid buffer overflow. Furthermore, without $\beta$ the end-to-end transmission delay of the adaptation system is not controlled.

The hard limiting operator $HDLIM_\alpha$ serves to reduce the impact of occasional large spikes in the driving function that can arise when the network delay suddenly changes. The invention relies on what amounts to the derivative of the buffer fill level. A step in the fill level thus translates to a large spike in the clock adjustment. Such steps in the fill level can result if the network delay properties suddenly change.

The hard limiting operator $HDLim_\beta$ serves to control the excursion the output frequency when a large change in the buffer fill level is needed. Such large changes can occur if the network delay suddenly changes or if the target fill level (Lopt) is altered.

The following is a general analytical analysis of the embodiment shown in FIG. 2, which will explain the underlying principle of the invention in more detail.

A Z-Transform representation of a generalized version of the recursion relationship presented above is:

$$F(z) = D(z)\,(L(z) + N(z))$$

where
  F (z)=Z transform of the output frequency
  D (z)=Z transform of the adaptation filter
  L (z)=Z transform of the maximum buffer fill level
  N (z)=Z transform of the error in estimates of L(z)

The maximum buffer fill level satisfies the following relation in the absence of jitter provided that the frequency parameters remain approximately constant over the interval of analysis:

$$Lmax_j = Lmax_{j-1} + T\,(fin_{j-1} - f_{j-1})$$

where
  $fin_{j-1}$=the frequency of the CBR source clock
  T=the time separation of fill-level estimates $Lmax_j$ and $L_{j-1}$ By deriving the Z transform of $Lmax_j$ and substituting it into the initial expression for F(z) we obtain:

$$F(z)=H(z) \; Fin(z)+((H(z) \; (z-1))/T) \; N(z)$$

where $$H(z)=D(z)T/(z-1+D(z)T)$$

Figure 3:
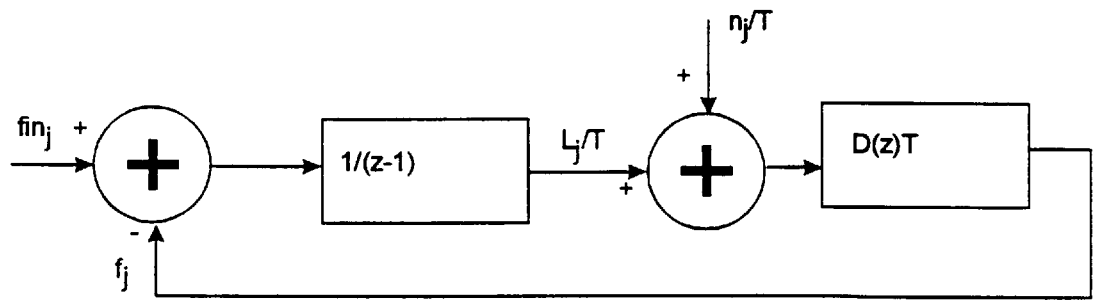
FIG. 3 illustrates a mathematical model of the clock recovery method employed in the invention.

The above expressions are represented by a digital phase-locked loop (DPLL)-like structure as shown in FIG. 3. Since the element $1/(z-1)$ is an integrator, the buffer fill-level is the integral of the frequency difference, and thus is effectively the phase error of the loop. The linearized baseband model of a classical DPLL can be derived, for example as described in "A survey of Digital Phase-Locked Loops," Proceedings of the IEEE, April 1981, pp 410–431, by backing the integrator $1/(z-1)$ out of the loop through the summer. An equivalent circuit for FIG. 3 is obtained by removing the $1/(z-1)$ block from its current position in the loop and applying it instead to both $f_j$ and $fin_j$ prior to their summation. The main remaining difference between this result and that described in the above article is in scaling of the noise and the loop filter. Thus, much of the standard analyses commonly performed for classical DPLLs are applicable.

The analytical representation presented above has a loop filter of the form:

$$D(z)=(\alpha(1-z^{-J})+\beta)/(1-z^{-1})$$

from which is obtained:

$$H(z) = \frac{\alpha T z^{-1} + \beta T z^{-1} - \alpha T z^{-1-J}}{1 - (2 - \alpha T)z^{-1} + z^{-2} + \beta T z^{-1} - \alpha T z^{-1-J}}$$

For T1 service adaptation the time interval T is:

$$T \approx BM/fin$$

where

B=number of data bits per cell (376 for ATM)

M=number of cells per block fin=nominal source clock frequency (1.544 Mhz for T1)

The stability of the above-described system will now be considered. Through repeated application of the Jury stability test to H(z) when the loop filter has the form D $(z)=(\alpha (1-z^{-J})+\beta)/1-z^{-1}$, it was found that the loop is stable if the following conditions are satisfied:

$$0 < \alpha T < 2^{2-J} - \beta T/2$$

$$0 < \beta T < 2^{3-J} - 2\alpha T$$

The loop will exhibit a highly oscillatory behavior as it nears the limits of stability, and extra delay in the loop can push it towards instability. It is thus important to operate well inside the stability limits.

Extra delays in the loop lead to an increased tendency for oscillatory behavior, and can make an otherwise stable loop unstable. For example, if J=1 and if there is an extra one-sample delay in the loop (i.e., a delay of T seconds), the Jury stability test produces the following limits for obtaining stability:

$$0 < \alpha T < .5 + \sqrt{.25 + \beta T}$$
$$0 \leq \beta T < \alpha T(1 - \alpha T)$$

when J=I and delay=T

One can see that the upper limits are substantially less than they would be without the extra delay.

A properly-designed loop must provide more than just stability: it should have few if any oscillations when presented with sudden input changes. For the present application, such oscillations occur when $\beta$ is too large relative to $\alpha$. In the special case of J=1, the transfer function becomes:

$$H(z)|_{J=1} = \frac{2(1-a)z - (1-a^2-b^2)}{(z-a)^2 + b^2}$$

where $$a = 1 - \frac{(\alpha T + \beta T)}{2}$$

$$b^2 = \beta T - \frac{(\alpha T + \beta T)^2}{4} = \beta T - (1-a)^2$$

From an inspection of the denominator of $H(z)|_{J=1}$ it is apparent that the loop response is critically damped when b=0. This means that the following inequality should be applied to avoid oscillatory behavior:

$$\beta T \leq 1 - \alpha T - 2\sqrt{1 - \alpha T}$$

when J=1

Now, with $\beta=0$ the convergence properties of the loop are quite consistent when $\alpha \times J$ is constant. The choice of J also has little effect on the influence of $\beta$ on the loop dynamics. Therefore, the following expression can be used to obtain a nearly-critically-damped loop for arbitrary J:

$$\beta T \leq 2 - \alpha JT - 2\sqrt{1 - \alpha JT}$$

It should be emphasized that this expression is only an approximation. For example, when J>1 it is possible for $\alpha$ alone to introduce oscillations. Additional loop delays can also introduce oscillations. Thus, it is prudent to choose $\beta T$ such that the loop is somewhat overdamped.

A simple measure of the convergence rate of the loop can be derived from the proportion of the estimated frequency difference that is corrected in a single step. While this ignores interaction between $\alpha$ and $\beta$ and provides only a tangential approximation for the convergence, it has been found to be consistently representative for all practical parameter selections. Now, we know that $$Lmax_j - Lmax_{j-J} = TJ(fin_j - f_j)$$

From this it appears that the $\alpha$ that would correct a frequency mismatch in a single step is:

$$\alpha_1 = 1/TJ$$

Thus, the proportion of frequency correction in a single step is $\alpha/\alpha_1$, and rate of frequency change per unit time is:

$$RATE = \alpha/\alpha_1 T = \alpha J$$

The interpretation of RATE is that a step discontinuity in the input frequency will be resolved by the loop in about 1/RATE seconds. The actual rate tends to be slower. For example, if one inspects the actual response of a critically-damped loop to a frequency step, one finds that the time it takes for the output frequency to match the input (i.e., the first zero crossing in the frequency error plot after the step discontinuity), is about 1.8/RATE. It is interesting to note that the convergence rate is not affected by the block size (M) or, implicitly, the update period T.

There is a direct nonlinear relationship between RATE and the −3 dB rolloff point of the closed-loop frequency response of the loop ($f_{3dB}$). If RATE is well below its maximum, i.e., if $\alpha<<\alpha_1$, then $f_{3dB}\approx$RATE/6 Hz. The divisor is larger for higher values of RATE. The divisor is between 5.5 and 6 for the configurations recommended in this document.

An approximate analysis of worst-case buffer fill-level excursion during frequency convergence is to temporarily set $\beta$ to zero. This is reasonably accurate because the approximate behavior of a critically damped second-order loop when presented with a step discontinuity in the input frequency is to first resolve the frequency mismatch at the rate determined by $\alpha$ and J, and then slowly bring back the buffer fill-level to Lopt at a rate determined by $\beta$. Now, since the proportion of frequency correction on each iteration is $\alpha/\alpha_1$, the change in fill level over N iterations is:

$$\Delta L = \Delta f\, T\, (1+(1-\alpha/\alpha_1)+(1-\alpha/\alpha_1)^2+(1-\alpha/\alpha_1)^{N-1}$$

where $\Delta L$=fill-level change (bits)

$\Delta f$=size of the frequency step (Hz)

Taking the limit as N goes to infinity one obtains:

$$\Delta L=(\Delta f\, T\, \alpha_1)/\alpha=\Delta f/\text{RATE}$$

Simulations indicate that this expression overestimates the fill-level excursion by a factor of about 1.3 for a critically-damped loop. The overestimate is less for over-damped loops.

An analysis will be made of the frequency disturbance due to fill level adjustment. This is an analysis of the peak frequency disturbance when the loop acts to resolve a deviation of the buffer fill-level from its prespecified "optimal" value ($L_{opt}$). Such a response will result if the Lopt parameter is adjusted during processing or if clock recovery device is activated when the buffer fill-level deviates significantly from $L_{opt}$. For the present approximate analysis, $Lmax_i - L_{opt}$ in the adaptation equation are replaced with the constant $\Delta L_{opt}$, the hard-limits are disabled, and the resulting steady-state frequency difference $\Delta f$ is computed. If $\Delta L_{opt}$ is the initial size of the fill-level deviation, then $\Delta f$ will be a rough estimate of the peak frequency disturbance. The modified adaptation equation comes to rest when $\alpha(L_i - L_{i-J}) = \beta L_{opt}$. Since $Lmax_i - Lmax_{i-J} = TJ(\text{fin-fout})$, it follows that the steady-state frequency difference is:

$$\Delta f_{ss} \approx \frac{\beta \Delta Lopt}{\alpha TJ} = \frac{\beta \Delta Lopt}{\text{RATE} \times T}$$

This expression overestimates the peak frequency disturbance because it ignores the fill-level adaptation that occurs before we reach the peak. Simulations indicate that it overestimates by a factor of about 1.3 for a critically-damped loop. The overestimate is less for over-damped loops.

It is also necessary to consider the hard limiting effects of $THR_\beta$ and $THR_\alpha$. The hard-limiting threshold $THR_\beta$ is present to control the range of frequency excursion when the fill-level deviates from its prespecified "optimal" value. Using the same logic as was presented in the preceding section, it can be shown that a sustained fill-level deviation which exceeds $THR_\alpha$ will result in the following frequency offset:

$$\Delta f_{ss} \approx \frac{\beta THR_\beta}{\alpha TJ} = \frac{\beta THR_\beta}{\text{RATE} \times T}$$

The hard-limiting threshold $THR_\alpha$ limits the influence of sudden large changes in the fill level due possibly to extraordinary amounts of error in the fill level estimates. This is intended for use as a means of rejecting widely deviant samples. One should avoid bringing it too close to the normal range of variation because it reduces $\alpha$ and may thus push the loop into oscillation or instability when $\beta$ is nonzero.

Formal analysis of the noise output of the loop requires a rather tedious contour integration and is not needed for gathering a general insight into its behaviour. First, let $\beta=0$ for the purpose of this analysis, because it is always much less than $\alpha$ for practical loops. This leads to the following approximation for the loop filter:

$$f_j - f_{j-1} \approx \alpha(Lmax_j - Lmax_{j-J})$$

If we run through the recursion we find that each output sample ($f_j$) is the sum of J successive input samples $Lmax_j$. If it is assumed that the input noise is uncorrelated, then $$\sigma^2_f = \alpha^2 J \sigma^2_L$$

where $\sigma^2_L$=variance of the maximum buffer fill level (bits$^2$)

$\sigma^2_f$=variance of the output frequency (Hz$^2$)

For the purpose of this analysis it is assumed that $\sigma^2_L$ is the same as the variance of the average buffer fill level obtained from a block of M fill-level samples. Thus, $$\sigma_L^2 = \frac{fin^2 \sigma_\gamma^2}{M}$$

where $\sigma^2_L$=variance of the ATM cell arrival times (sec$^2$)

This leads to the following expression for the frequency jitter (in Hz$^2$)

$$\sigma_f^2 \approx \frac{\alpha^2 J fin^2 \sigma_\delta^2}{M} = \frac{\text{RATE}\, \alpha fin^2 \sigma_\delta^2}{M}$$

Finally it is common to specify jitter in terms of unit intervals rather than frequency, where a unit interval is a period of the T1 clock (648 ns).

The following formula, with the dimension UI$^2$ provides a rough comparison with such specifications:

$$\sigma^2_{UI} = \sigma^2_f T^2 \approx \text{RATE} \times \beta^2\, M\alpha\sigma^2_\delta$$

The choices of M and J are affected by factors other than noise reduction. For example, each increment of J increases the order of the loop filter, thereby making it more difficult to analyze and tightening the stability constraints. A small M implies a small T which leads to a potentially larger impact of the delay on the loop performance and stability.

The preferred settings for T1 clock adaptation are summarized in the Table below. For both modes the loop is updated with a frequency of about 20 Hz, i.e. T=200/4106= 0.0487 secs. The loop parameters are well within the stability range bounds. The fast adaptation configuration produces a system having a −3 dB rolloff of about 0.1 Hz. It produces a maximum fill level excursion of $\Delta L$<200 bits in response to a 100 Hz frequency step, and a maximum disturbance of $\Delta f_{ss}$<30 Hz in response to a large fill-level adjustment. The slow adaptation configuration produces a system having a −3 dB rolloff of about 0.03 Hz. It produces a maximum fill level excursion of $\Delta L$<500 bits in response to a 100 Hz frequency step, and a maximum disturbance of $\Delta f_{ss}$<11 Hz in response to a large fill-level adjustment. It is finally both configurable and sufficiently overdamped to provide a maximum low frequency amplification of less than 0.5 dB.

TABLE

| Parameter | Adaptation Fast | Mode Slow |
|---|---|---|
| RATE | 1/2 | 1/5 |
| α | 0.0625 | 0.025 |
| β | α/70 | α/200 |
| J | 8 | 8 |
| M | 200 | 200 |
| $THR_\alpha$ | 256 | 256 |
| $THR_\beta$ | 800 | 800 |

The described embodiments of the invention are capable of providing CBR service adaptation in an ATM network.

I claim:

1. A clock recovery unit for providing a clock recovery function in the receiving entity of a system to implement adaptation of constant bit-rate (CBR) services over an asynchronous transfer mode (ATM) or ATM-like network, comprising a buffer for receiving incoming cells; a sampling unit for periodically sampling the buffer fill level $L_i$; an estimation unit for obtaining an estimate $Lx_j$ of the buffer fill level on arrival of substantially undelayed cells from a series of buffer fill-level samples $L_i$; and a frequency adjustment logic unit providing at its output a control signal at a given clock frequency $f_j$, said frequency adjustment logic unit making incremental adjustments to said clock frequency $f_j$ to cause the steady state mean of said estimate $Lx_j$ of the buffer fill level on arrival of undelayed cells, or a derivative thereof, to move toward a predefined optimal operating point.

2. A clock recovery unit as claimed in claim 1, wherein said estimation unit comprises means for extracting the maximum fill level of said predetermined number of samples.

3. A clock recovery unit as claimed in claim 1, wherein said estimation unit comprises means for deriving a composite estimate from a mean fill level of said buffer in combination with a maximum fill level of said buffer.

4. A clock recovery unit as claimed in claim 1, wherein said estimation unit comprises means for deriving a composite estimate from a minimum fill level of said buffer in combination with a maximum fill level of said buffer.

5. A clock recovery unit as claimed in claim 1, wherein said sampling unit samples the buffer fill-level in approximate synchronization with the arrival of ATM cells.

6. A clock recovery unit as claimed in claim 1, further comprising a subtractor for subtracting a predetermined optimal value $L_{opt}$ from the estimate of the buffer fill-level $Lx_j$ to produce a difference value, a differentiator for deriving the derivative of said estimate of the buffer fill-level $Lx_j$, said difference value and the derivative of said estimate of the buffer fill-level $Lx_j$ being applied as first and second inputs to said frequency adjustment logic unit which is adapted to incrementally adjust said clock frequency fj to cause one or both of the inputs thereof to move toward said predetermined optimal value.

7. A clock recovery unit as claimed in claim 2, wherein said estimation unit extracts the maximum fill level $Lmax_j$ and includes a divider for dividing the clock rate of the samples by a number M and a Maximum-Sample-and-Reset unit for producing at its output a signal representing $Lmax_j$.

8. A clock recovery unit as claimed in claim 7, wherein said differentiator is provided by a J sample delay circuit and a subtractor.

9. A clock recovery unit as claimed in claim 8, wherein said frequency adjustment logic unit includes a pair of multipliers each having respective first inputs receiving a value dependent on the maximum fill-level $Lmax_j$ and the derivative thereof, and second inputs receiving predefined configuration parameters α and β.

10. A clock recovery unit as claimed in claim 9, wherein said frequency adjustment logic unit comprises hard limit units connected to respective multipliers, and a summer for summing the outputs of said multipliers to produce said control signal, said summer having its output looped back to a third summation input.

11. A clock recovery unit as claimed in claim 10, further comprising a one sample delay unit between the output of said summer and said third input thereof.

12. A clock recovery unit as claimed in claim 11, wherein α is about 0.0625 and β is about 0.0009 in a fast adaptation mode.

13. A clock recovery unit as claimed in claim 12, wherein α is about 0.025 and β is about 0.0001 in a slow adaptation mode.

14. A clock recovery unit as claimed in claim 1, wherein said means for obtaining an estimate of the buffer fill level obtains said estimate from successive series of samples, each having a number M of samples.

15. A clock recovery unit as claimed in claim 14, wherein M is constant from one series of samples to the next.

16. A clock recovery unit as claimed in claim 14, wherein M varies from one series of samples to the next.

17. A method of providing a clock recovery function in the receiving entity of a system to implement adaptation of constant bit-rate (CBR) services over an asynchronous transfer mode (ATM) or ATM-like network, comprising the steps of receiving incoming cells in a buffer; periodically sampling the buffer fill level $L_i$; estimating the buffer fill level on arrival of substantially undelayed cells $Lx_j$ from a series of buffer fill-level samples $L_i$; outputting a control signal at a given clock frequency $f_j$; and making incremental adjustments to said clock frequency $f_j$ to cause the steady state mean of the estimate $Lx_j$ of the buffer fill level on arrival of undelayed cells, or a derivative thereof, to move toward a predetermined optimal value.

18. A method as claimed in claim 17, wherein said estimate $Lx_j$ is derived from a maximum fill level of said buffer.

19. A method as claimed in claim 17, wherein said estimate is obtained from successive series of M samples, wherein M is the number of samples in a said series.

20. A method as claimed in claim 19, wherein M is constant from one series of samples to the next.

21. A method as claimed in claim 19, wherein M varies from one series of samples to the next.

* * * * *